United States Patent

Len-Rios

Patent Number: 5,915,323
Date of Patent: Jun. 29, 1999

[54] MAGNETIC SYSTEM FOR MOVING SHIPS THROUGH CANALS AND CANAL LOCK SYSTEMS

[76] Inventor: Felipe Antonio Len-Rios, PSC 001 Box 37301, Washington, D.C. 20013

[21] Appl. No.: 08/961,260

[22] Filed: Oct. 30, 1997

[51] Int. Cl.$^6$ .................................................. B63H 25/00
[52] U.S. Cl. .................................. 114/144 RE; 440/113; 114/144 R
[58] Field of Search ........................... 180/168; 104/281; 114/144 R, 144 RE; 701/21; 440/113

[56] References Cited

U.S. PATENT DOCUMENTS

| | | | |
|---|---|---|---|
| 3,653,456 | 4/1972 | Uemura | 180/168 |
| 3,664,268 | 5/1972 | Lucas et al. | 104/281 |
| 5,362,263 | 11/1994 | Petty | 114/144 E |

Primary Examiner—Stephen Avila
Attorney, Agent, or Firm—Longacre & White

[57] ABSTRACT

Magnetic forces developed from electromagnets, superconductor magnets, or other magnets, serve as the basic elements to move, control, direct and stabilize ships in locks chambers and canals. Basic requirements include, but are not limited to, a power supply, the magnetic devices and a system for operation and control of the magnetic devices. This process of moving ships through canals and locks chambers will eliminate other, more expensive means currently in use. The magnetic system will speed the process of canal transit because of its simplicity of operation. It will require much less hardware and human resources to operate and maintain. The magnets would be installed in the locks chamber floors. In canals and approach lanes, the magnets could be placed on a substructure at the bottom of the channel using different structural elements depending on the channel's shape, size and dredging needs. The essence of this invention is to use the most advanced technology of magnetism available to move ships through locks and canals safely, efficiently and economically.

9 Claims, 6 Drawing Sheets

MAGNETIC SYSTEM FOR MOVING SHIPS THROUGH CANALS AND CANAL LOCK SYSTEMS

BACKGROUND OF THE INVENTION a) Field of Invention

This invention relates directly to the use of magnetic forces for centering, moving, stabilizing and halting of ships within canals and lock chambers.

b) Discussion of Prior Art

Heretofore, ships have been centered, moved and stopped within lock chambers with the use of locomotives, or other means of exacting physical exertion on the ship, and causing it to be moved, stopped and centered. In the case of locomotives, they are tied with cables to the ships, and by regulating cable length, and the force exerted on the cable, control the ships. An attempt was made in 1957 to replace the system with a different kind of locomotive. In the case of the Panama Canal, companies involved were General Electric, LeTourneau and Mitsubishi. General Electric made the locomotives used prior to 1962. LeTourneau developed two locomotives in 1957, each of which was unfit for work at the Panama Canal. Mitsubishi was engaged to manufacture locomotives for the Panama Canal, and has been supplying them since 1962. For 83 years, in the Panama Canal, the only prior art for propelling ships through lock chambers was one or another type of locomotive.

The following is a description of the disadvantages of the prior art. The cost is in the extreme, regarding the purchase and maintenance of locomotives and the tow tracks. A large fleet of these vehicles is necessary to maintain constant and optimum traffic flow through canals lock chambers. A large amount of line handling personnel are required to manipulate lines and cables, which are physically attached to the ship. These jobs are dangerous to those who do them. Since the locomotives are complex machines, it is necessary from time to time to replace expensive and hard to get spare parts. Highly specialized personnel are required to maintain and repair the locomotives. Personnel are needed aboard each ship to ensure that it is centered within the locks chambers. In canal channels, up to four tugboats are needed to guide the ships. There would be a substantial additional cost for the modification of locomotives to support an automatic ship centering system. The current system requires intercommunication between pilot, lockmaster, tugboat operator and locomotive operator. Each additional person involved in the communication creates a greater chance for lag and human error.

SUMMARY OF THE PRESENT INVENTION

This invention is a process. The function of the invention is to move ships through canals and lock chambers using magnetic forces, which can be created with any number of devices. The ships, as they pass through canals and lock chambers will need to exhibit certain behavior. They need to move forward, slow and stop, remain in the center of channels or chambers and remain stabilized. This process invention dictates that magnets, placed in the center of either chamber of channel, can, by merely exerting force, attract a ship to the center of the lane. A ship can be caused to move in a particular direction by putting a greater magnetic force in the direction other ship is to move and a lesser magnetic force in the opposite direction. The ship can be stabilized by the attraction of the magnetic forces on its hull, keeping the ship upright.

Needless to say, this is a beneficial use of magnets (in any form), as they have never been used before to propel ships that are in water. By varying the magnetic attraction on a ships hull, it can be manipulated to perform the desired effects that result in a safe and efficient transit.

Accordingly, several objects of the present invention are:

to align ships precisely in the center of canals and locks, without using mechanical means;

to economize the canal-transiting process;

to speed canal traffic, increasing the amount of traffic possible;

to offer greater flexibility for the manipulation of ships through a canal or locks chamber;

to permit safe two-way traffic, 24 hours a day, without regard to ship size;

to permit canal transit despite inclement weather;

to allow for more precise scheduling.

Further objects and advantages of my invention will become apparent from a consideration of the drawings and ensuing description thereof.

DETAILED DESCRIPTION OF THE PREFERRED EMBODIMENT

The essence of this invention is not the magnets per se, but the utilization of a magnetic system within locks chambers and canals to move and control ships.

The term magnet, as referred to in this document, applies to any device which can focus or generate magnetic forces. The type of magnet suggested by current technologies is the electromagnet or the superconductivity magnet but this concept of this invention should be limited thereto.

Figure 1:
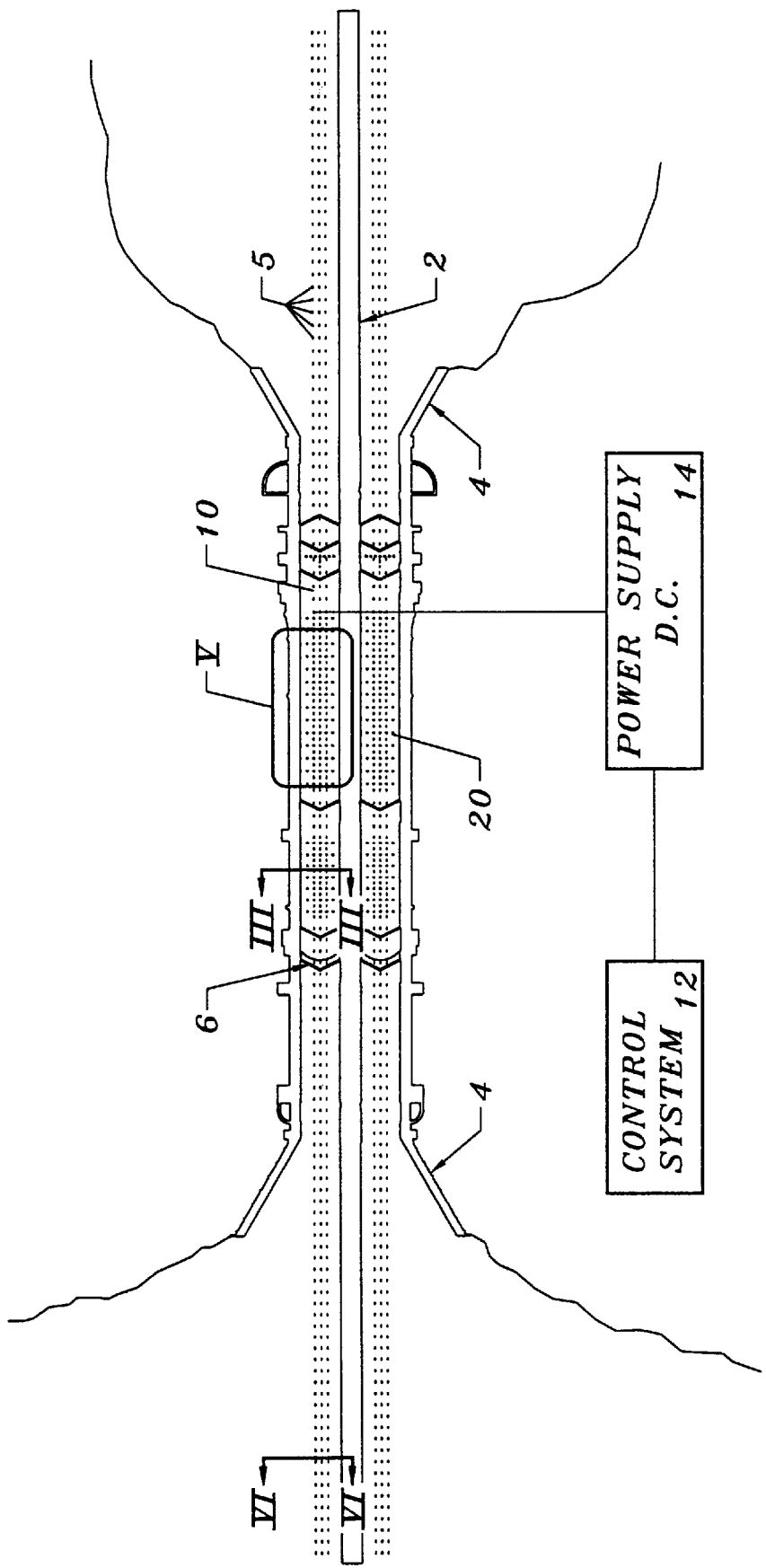
FIG. 1 is a full plan view of a two-lane lock chamber, whereby the three parallel lines of dots in the middle of the two lanes indicate the placement of magnets.
Figure 3:
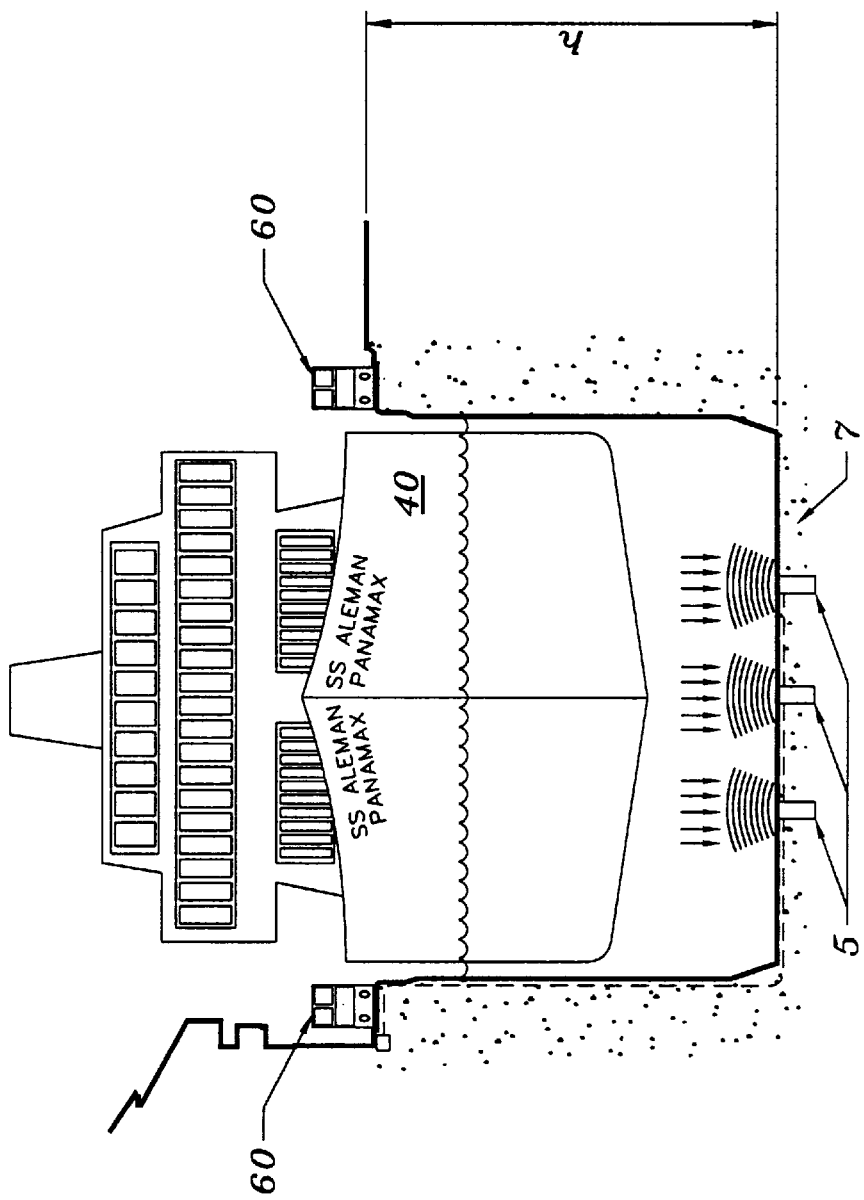
FIG. 3 shows a cross-section of a lock chamber with a ship in it, and illustrates where the magnets will be installed, for maximum effect.
Figure 4:
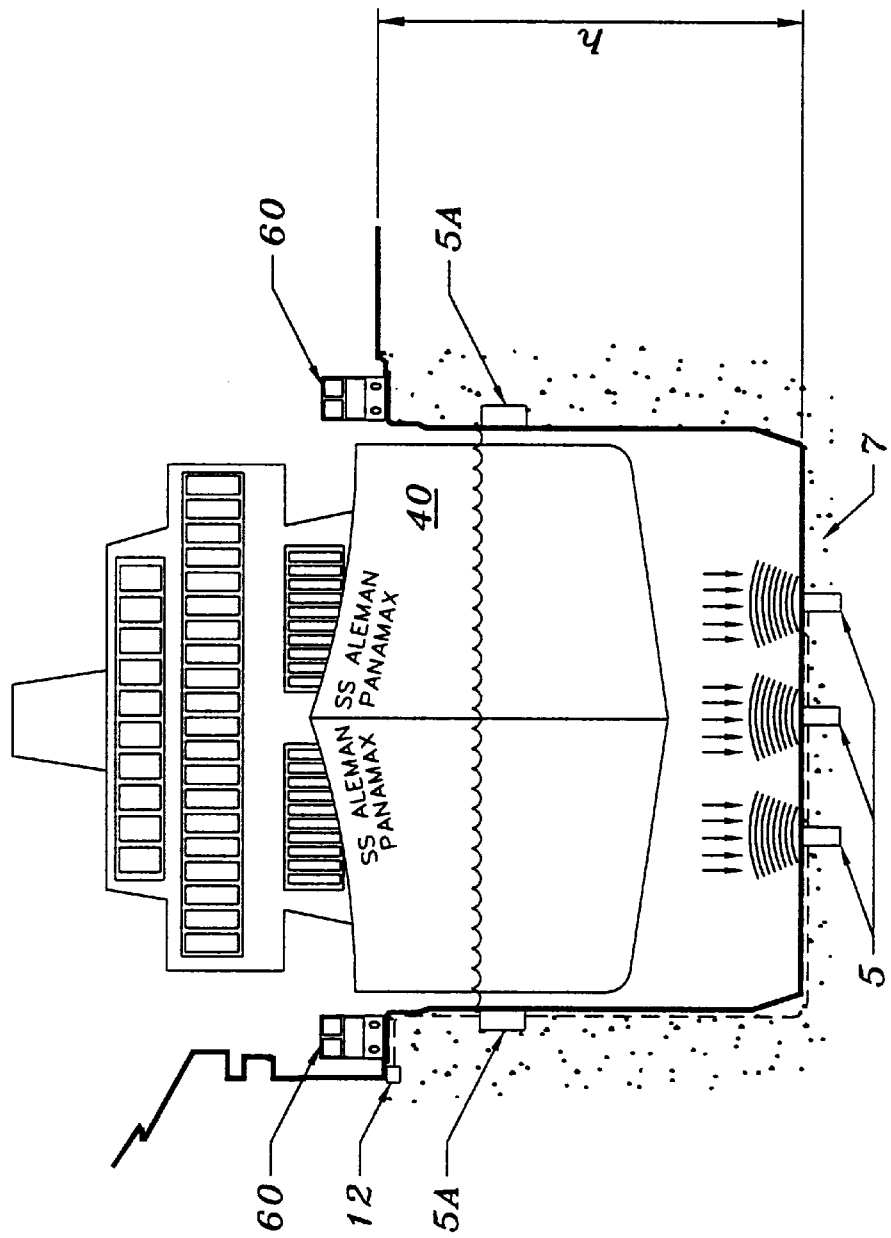
FIG. 4 is similar to FIG. 3, except it shows where additional controlling magnets can be placed to aid in the centering and stabilization of ships in lock chambers.

FIG. 1 shows the general plan view of two lock chambers 10, 20 side by side using the magnets 5 shown at the bottom and flush with the surface of the chamber floor (see FIG. 3 and 4). The canal of FIG. 1 consists of an approach wall 2, wing walls 4 and miter gates 6. The geometric configurations and the magnetic forces required will vary with each individual ship and canal at issue. On the outside of the locks chambers the basic element to move the ships continues to be the electromagnets resting over a underwater substructure foundation (see FIG. 6). A power supply 12 and a control system 14 such as a programmable logic control unit will be utilized to control the magnetic transport system of this invention.

Figure 2:
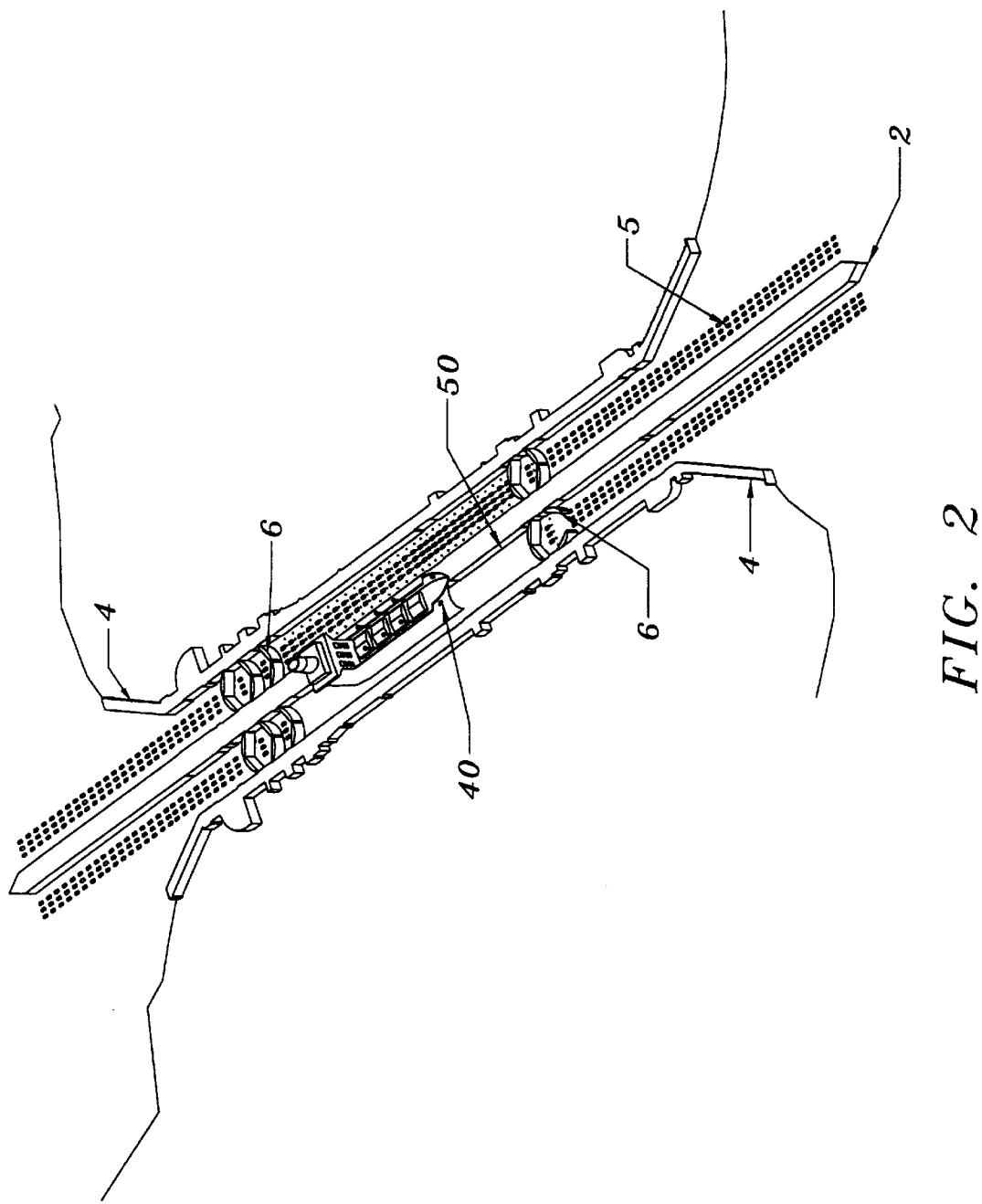
FIG. 2 is an isometric depiction of a lock chamber, and the position of the magnets.

FIG. 2 shows an isometric drawing of the whole two lane locks chamber system wherein a ship 40 is being propelled by magnetic forces through the lock chamber 50.

FIG. 3 shows a section of the locks chambers with a ship 40 in the lock (Panamax ships are ships designed to move the maximum amount of cargo through the Panama Canal). To control the ship in the conventional manner, eight locomotives 60, each pulling 32,000 kg, are attached to the ship 40 via cables. The novel function is to eliminate the use of the locomotives 60 and use attracting magnetic forces generated by the magnets 5 as a means to move. Preferably, the magnets 5 will be placed accurately along the centerline of a chamber, to ensure that the ship will stay straight and centered in the canal. One must note that the magnetic forces will accentuate any list (sway) the boat has. It is therefore assumed that the ships going through the canals are properly ballasted. Electromagnets are manufactured today which are more than strong enough to produce enough power to manipulate ships.

FIG. 4, which is almost identical to FIG. 3, illustrates where additional controlling magnets 5a can be placed on the walls of the lock chamber to aid in centering and stabilizing the ship 40 within the lock chamber.

Figure 5:
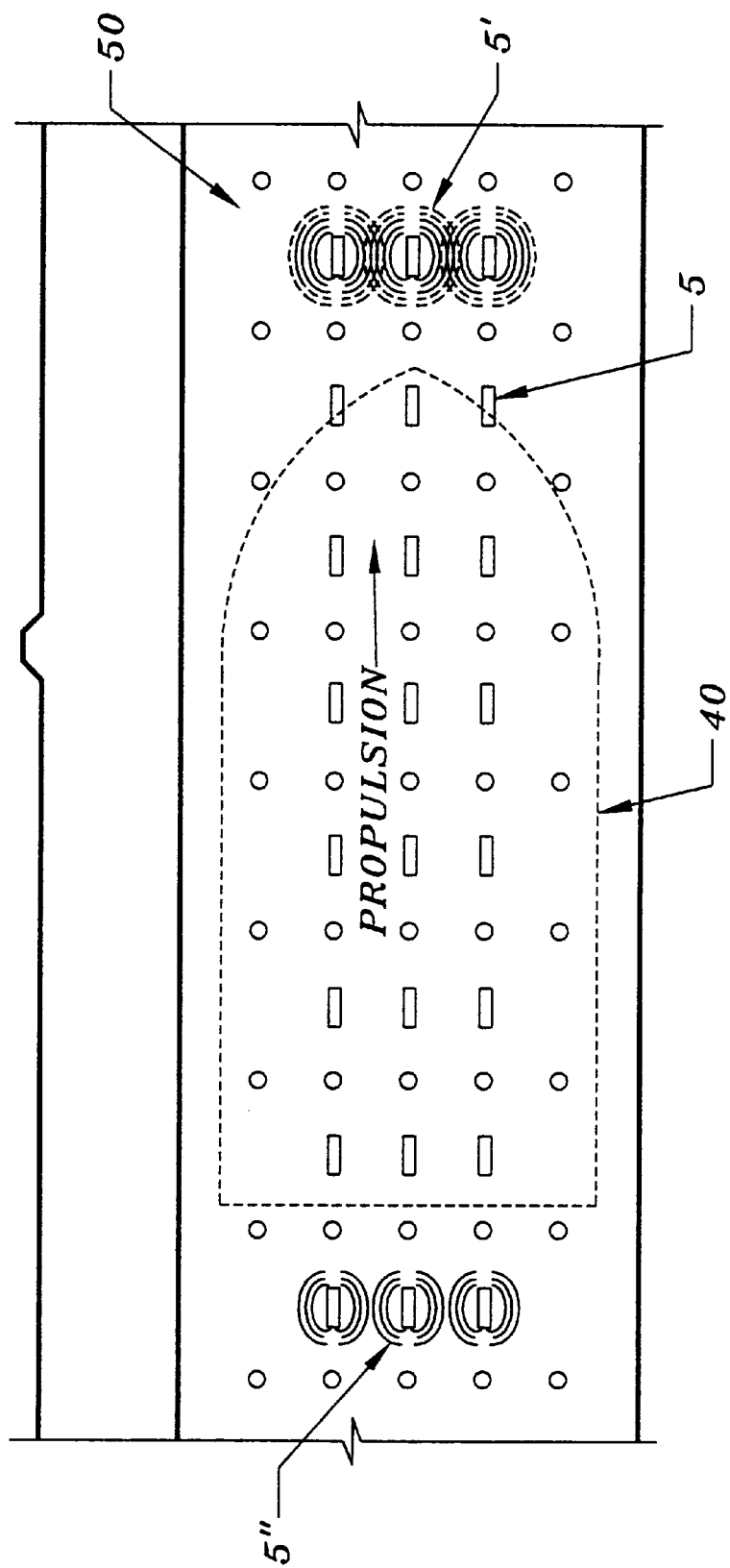
FIG. 5 is a blowup of the section described in FIG. 1 and shows in detail the placement of magnets within a lock chamber, and how, by varying the forces, a ship can be caused to move.

FIG. 5 shows a chamber with the magnet layout in the center of the chamber, and the propulsion effect produced by creating the strongest force with first magnets 5' in the direction the ship 40 is to move towards, and a weaker force with the second magnets 5" in the rear, to keep the ship 40 aligned in the direction it is moving.

Figure 6:
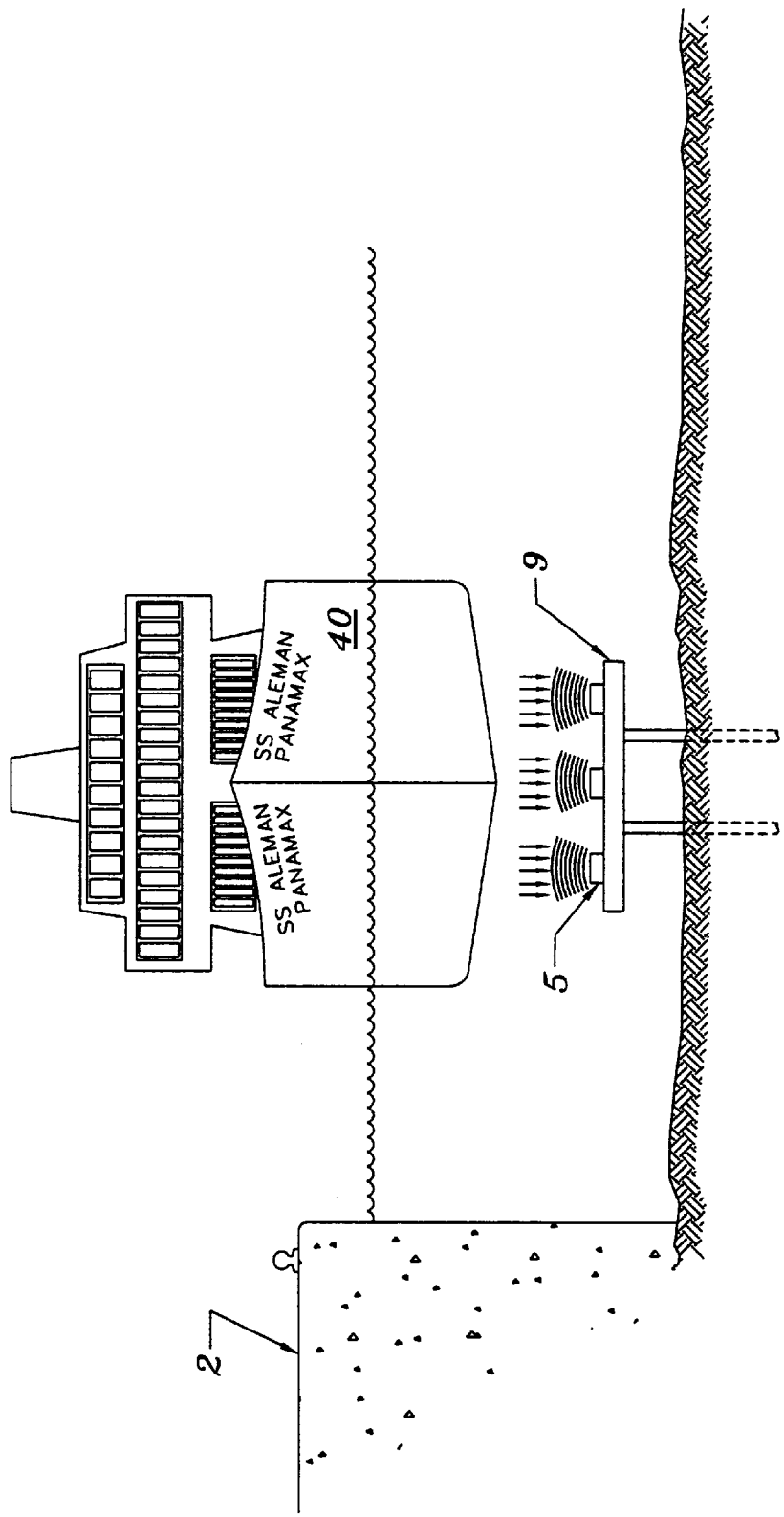
FIG. 6 is a cross-section of a canal channel, as it approaches the locks chamber. Indicated are the approach wall, as well as an example of a foundation to support the electromagnets that will effect ship movement.

FIG. 6 shows a ship either moving along the approach wall 2 in the lake or sea side wherein the magnets are mounted on a substructure 9. The object of the invention is to move ships automatically through difficult curves, during heavy tropical rains, pass safely in a two way traffic, move through heavy dense fog and permit the transit of ships that are not permitted during the night time. This novel invention will permit 24 hours transit through any canal.

The operation of this invention consists of using magnets of differing forces to attract a ship to a certain direction and therefore causing it to be propelled in that direction. In this case magnets on the lock chamber floor provide a strong attracting force in the direction this ship is to travel and the and a weaker force in the rear, to keep the ship aligned in the direction it is moving. The forces can be equalized or reversed momentarily to reduce or eliminate ship inertia, and causing it to slow or stop. The chamber floor layout of magnets, when activated, forces the ship, which is innately attracted to the magnets, to remain perfectly centered.

With the two lateral lines of magnets using equal magnetic force, the ship is guaranteed to be centered, regardless of external forces (weather, tides and currents). Some form of computer of computational application (such as a programmable logic control unit) would be used to calculate the optimum combination of magnetic forces to be used in controlling ships.

While the above description contains many specificities, these would not be construed as limitations on the scope of possible application of this invention, but rather of examples of how best to apply it using today's technologies (electromagnetism and superconductivity magnets). Many other variations are possible, and more will become evident in the future.

I claim:

1. A magnetic ship propulsion system for propelling a ship through a body of water, said system comprising:

a path of travel defined within a body of water;

a plurality of magnets disposed within said body of water along said path of travel, said plurality of magnets capable of generating an attractive magnetic force to a ship traveling through said body of water alone said path of travel;

a control means for controlling said plurality of magnets to vary said attractive magnetic force of said plurality of magnets along said path of travel, said control means thereby producing a propulsion effect which controls motion of the ship along the path of travel.

2. The magnetic system of claim 1, wherein said plurality of magnets are placed in the center of a channel defined by said body of water to thereby maintain said ship in a center of said body of water and to stabilize a position of said ship.

3. The magnetic system of claim 1, wherein said plurality of magnets comprises a series of at least two magnets disposed side-by-side along said path of travel.

4. The magnetic system of claim 3, wherein said plurality of magnets comprises a series of three magnets disposed along said path of travel.

5. The magnetic system of claim 1, further comprising at least one magnet adjacent each side of said ship to aid in centering and stabilizing the ship within the body of water said at least one magnet positioned on a substrate disposed on each side of said ship.

6. A method of propelling a vehicle through a body of water along a desired path of travel, said method comprising the steps of:

locating a plurality of magnets along said desired path of travel, selectively generating a larger magnetic force in a first group of magnets located upstream of said desired path of travel than in a second group of magnets located downstream of said desired path of travel.

7. The method of claim 6, further comprising the step of centering and stabilizing the vehicle within the body of water by utilizing additional magnets adjacent opposite sides of said vehicle.

8. A magnetic system for propelling a ship along a path through a waterway, comprising:

a series of magnets attached to an underwater substrate positioned in the waterway and centered on the path;

a power supply for providing power to the series of magnets; and control means for controlling the magnetic forces output by the series of magnets by varying the power supply to the magnets and thereby also varying the relative magnetic forces generated by the series of magnets, said control means thereby controlling the propulsion of the ship along the path.

9. The system according to claim 8, further comprising stabilizing magnets positioned on substrates adjacent to each side of the ship, said stabilizing magnets also being controlled by said control means.

* * * * *